Dec. 9, 1930. J. B. KERN 1,784,013
GUARD FOR SPECTACLES AND EYEGLASSES
Filed Aug. 14, 1929

INVENTOR
John B. Kern.
by H.W. Kenway. Atty.

Patented Dec. 9, 1930

1,784,013

UNITED STATES PATENT OFFICE

JOHN B. KERN, OF MONTCLAIR, NEW JERSEY

GUARD FOR SPECTACLES AND EYEGLASSES

Application filed August 14, 1929. Serial No. 385,805.

This invention relates to guards for spectacles or eyeglasses, and more particularly to a novel construction of self-adjusting or self-conforming guard for the same.

It is desirable that the guards should have the capacity to accommodate themselves instantly to the contour of the wearer's nose, regardless of its shape, when the spectacles or eyeglasses are placed in position and the guards are pressed yieldingly against the nose by the tension of the bridge or otherwise. To accomplish this end, I have found that a universal movement of each guard is most effective. It is important, however, that while the guard should have capacity for free universal movement, such movement should be limited in certain respects to insure the presentation of the guard with its engaging face disposed between certain limiting positions, otherwise a displacement of the spectacles or eyeglasses may be caused in the conforming movement of the guard or the edge of the guard may engage the nose of the wearer.

My invention is particularly concerned with the difficult problems of providing for a free universal adjusting movement within limits necessary to permit accurate and instantaneous self-adjustment of the guard and at the same time insuring that the guard shall always be presented in convenient position. I have discovered that satisfactory results may be secured by employing between the frame and guard a ball and socket connection of a special character. By so connecting the parts as to limit the guard movement to different amplitudes about separate axes properly oriented with reference to the general contour of the guard, I am enabled to provide for the desired universal movement of the guard with reference to the frame throughout a limited degree of amplitude and also permit movement of the guard through a larger amplitude of movement about one axis only.

As herein shown, the guard is elongated vertically in its contour and is limited in its angular adjusting movement about a vertical axis to an amplitude less than is permitted in its movement about a horizontal axis. In being presented to the nose of the wearer, therefore, the vertical slope of the guard is at once determined by the preliminary engagement of the guard with the nose of the wearer at a point remote from the axis of the guard, that is to say, toward one end or the other, and having effected this preliminary or approximate positioning of the guard the final and universal self-conforming movement thereof is free to take place by reason of its capacity for universal movement.

Figure 1:
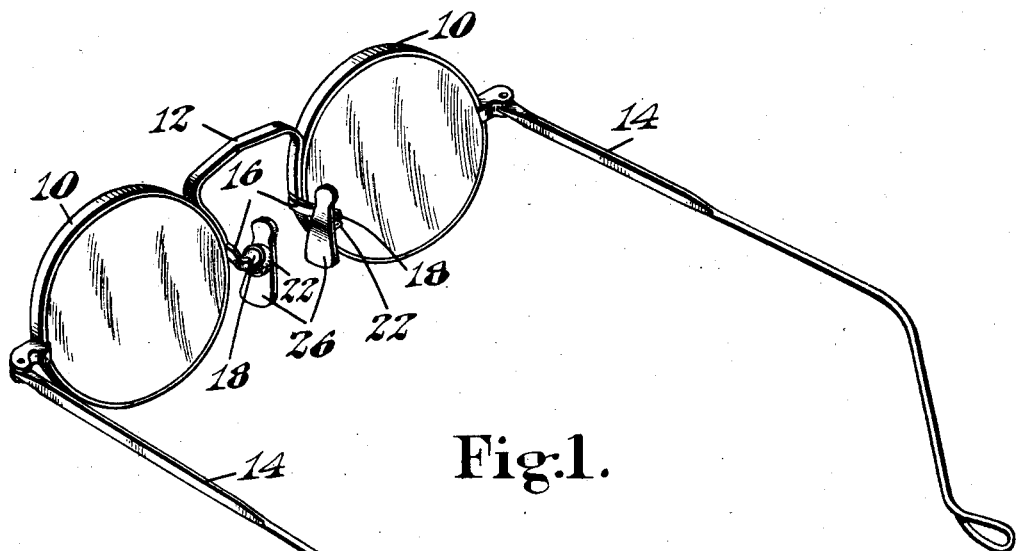
Figures 2, 3:
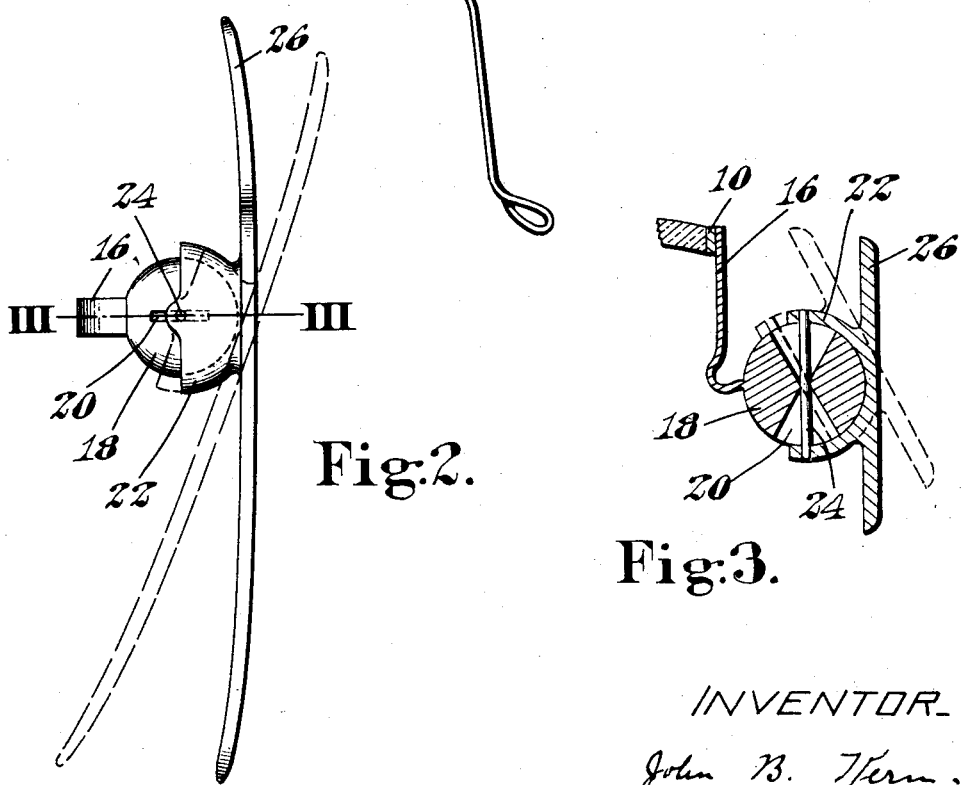

These and other features of the invention will be best understood and appreciated from the following description of a preferred embodiment thereof, selected for purposes of illustration and shown in the accompanying drawings, in which Fig. 1 is a view in perspective of a pair of spectacles equipped with my invention;

Fig. 2 is a view in side elevation, on an enlarged scale, of the guard and adjacent parts; and Fig. 3 is a view in horizontal cross section on the line 3—3 of Fig. 2, also on an enlarged scale.

I have shown my invention as applied to a pair of spectacles of a well-known type. It will be understood, however, that its application is not limited to this or to any specific type of spectacles or eyeglasses but is of general utility in any construction where a self-adjusting or self-conforming guard is desirable.

The spectacles herein shown comprise the lens frames 10 which are connected by a bridge 12 extending upwardly from its point of connection with the frames 10 and then transversely and being somewhat resilient in character so as to press the guards yieldingly against the nose of the wearer. Bows 14 are connected to the outer side of each lens frame 10 and a rearwardly and inwardly extending shank or arm 16 is secured to the inner side of each frame.

Each of the shanks 16 supports one of the guards 26 and for this purpose is provided at its free end with an inwardly extending loop carrying a ball 18. The shanks extend substantially horizontally from their point of attachment with the frame 10 and are of pliable material so that they may be adjusted by bending in the preliminary fitting of the spectacles for the wearer. Each ball 18 is provided with a pair of sector-shaped slots 20 opening into each other at their vertices and being horizontally disposed, that is to say, the slots extend circumferentially of the ball in a horizontal direction.

Each guard 26 is vertically elongated in its contour and is shown as substantially keyhole shaped, although the shape of the guard is of secondary importance only and it may have any desired outline best adapted for the requirements of the case. The guard 26 is slightly curved longitudinally but substantially flat transversely, and is provided upon its inner face with a semi-spherical socket member 22, shown here as formed integral with the guard. The socket member 22 is of such dimension as to fit the ball 18. Between the sides of the socket 22 and diametrically disposed extends a transverse pin 24 corresponding in diameter substantially to the width of the slots 20 and passing through them, as indicated in Fig. 3 of the drawings. It will be apparent that the pin 24 constitutes a horizontally disposed journal upon which the socket member 22 and the guard 26 may swing as about a horizontal axis. The capacity for movement in this sense is illustrated in Fig. 2, in which the dotted line position of the guard and socket indicate one position they are free to assume when rocked about the axis of the pin 24. It will also be apparent that the guard and socket may swing about a vertical axis corresponding to the vertical diameter of the ball 18 within the limits of movement permitted by the end walls of the sector-shaped slots 20. The capacity of the guard for movement in this sense is indicated in Fig. 3, wherein the guard and socket are shown in full lines in an intermediate position and in dotted lines in one position of extreme horizontal angular adjustment.

The resultant movement permitted to the guard 26 by reason of the construction of its mounting is universal to the extent permitted by the length of the slots 20. In the illustrated construction this is approximately 60°. Beyond the universal movement about two axes, the guard is permitted a further movement about the horizontal axis of the pin 24, limited only by the engagement of the edge of the socket 22 with the shank 16. In the construction herein illustrated this movement may amount to substantially 150°. To express it differently, the guard is free to swing vertically through an angle of substantially 150° in every horizontal position of the pin 24 between the end walls of the slots 20. I have thus provided a mounting for the guard which is particularly responsive in causing the guard to conform itself to any surface to which it may be presented, so that the guards act readily to support the spectacles in the desired position in which they are placed by the wearer.

It will be apparent that the shank 16 may be modified without in any way interfering with the self-conforming action of the guard, or if it should be desired the ball may be mounted directly upon the lens frame and the shank omitted.

Having thus described my invention, what I claim as new and desire to secure by Letters Patent of the United States is:

1. In a spectacle or eyeglass, a frame and a guard having a ball and socket connection therewith including a ball attached to the frame having opposed radial slots, and a socket secured to the guard and having a pin extending internally and diametrically through the ball and movable both rotatably and angularly in said slots.

2. In a spectacle or eyeglass, a frame, a pliable shank secured to the frame, and a guard having a ball and socket connection with the shank including a ball on the shank having connected sector-shaped slots, and a socket on the guard having a diametrically disposed transverse pin angularly movable between the walls of said slots and freely rotatable therein.

3. A device of the class described comprising a frame having a bridge, a shank secured to the frame and having a ball at its end with radial slots of limited length oppositely disposed in a horizontal plane, a guard having a socket fitting the ball of said shank, and a pin secured diametrically in the socket, passing through the slots and forming an axis about which the guard may swing vertically while the guard is free also for a limited horizontal movement by the clearance for the pin in said slots.

4. A device of the class described comprising a frame having a bridge, a pliable shank projecting rearwardly and inwardly from the frame and provided with a ball at its end with opposed sector-shaped slots having converging end walls, and a flat vertically curved guard having a socket fitting the ball of said shank and a pin extending diametrically between the sides of the socket and through the slots of the ball, thereby permitting universal movement of the guard with respect to the frame in a limited degree and further movement of the guard about one axis only.

5. In a spectacle or eyeglass, frame and guard members, one having a ball and the other a spherical socket within which the ball is fitted, the socket being open at one side and the ball having a connection with its associated member which passes through the open side of the socket, and a pin disposed diametrically and internally of the ball and socket, one element of the connection having a sector shaped slot in which the pin is movable both angularly and rotatably to permit corresponding adjusting movements of the guard.

JOHN B. KERN.